March 15, 1966 W. V. CLOW 3,240,175
SEED SEGREGATOR AND PLANTER
Filed Oct. 21, 1963 3 Sheets-Sheet 1

INVENTOR.
WILLIAM V. CLOW
BY Paul Bliven

INVENTOR.
WILLIAM V. CLOW
BY Paul Bliven

March 15, 1966  W. V. CLOW  3,240,175

SEED SEGREGATOR AND PLANTER

Filed Oct. 21, 1963  3 Sheets-Sheet 3

INVENTOR.
WILLIAM V. CLOW
BY Paul Bliven

United States Patent Office 3,240,175
Patented Mar. 15, 1966

3,240,175
SEED SEGREGATOR AND PLANTER
William V. Clow, 1401 Abbott St., Salinas, Calif.
Filed Oct. 21, 1963, Ser. No. 317,543
5 Claims. (Cl. 111—77)

The present invention relates to the construction and operation of a seed segregator and its incorporation in a seed planter. The present device is operable to segregate seeds such as those of celery and lettuce, where the seeds are very small and nonspherical. Celery seeds number 2,500 per gram, and lettuce 600 per gram. It is in the planting of these small and irregular seeds that it has been found difficult to obtain consistent segregation. Segregation of seed when planting is desirable for the purpose of reducing seed costs and thinning costs.

Applicant achieves rapid segregation by the use of small diameter hollow needles having suction applied to the inside of the needle so that when a needle passes thru a mass of the seeds a single seed is adhered to the free end of the needle. It has been found that the outside diameter of the needle end must be about or less than the smaller dimension of the seed, where there is a length and width or thickness to the seed. If the needles are not this small in relation to the seed, two or three, or even more, will adhere to the needle end.

Other problems and difficulties found and remedied are those of keeping the inside of the needles clean, the uniform disengagement between needle and seed, and the uniform spacing of the seeds in the ground. Nonuniform ground spacing has been found to be due to variations in the time or place at which seed separation from the needles took place, and variations in time between separation and seed emplacement.

Having in mind the above and other problems of prior seed planting devices, it is an object of the present invention to devise a seed segregator that will segregate extremely small seeds and deliver them at equal spaced time periods, periodic delivery, in the planting furrow.

Another object is that of using fine hollow needles with suction applied therein for picking individual seeds out of a mass thereof.

A further object is that of cleaning the inside of such needles during the use of such for seed segregation.

A further object is that of programming the air pressure in a series of hollow needles to effect seed segregation.

A device remedying the defects of the prior art devices and achieving the above objects is constructed by mounting a hollow drum for rotation slightly above a mass of seed in a hopper that just clears the ground above the furrow to be planted; by extending radially outward of such drum a plurality of evenly circumferentially spaced coplanar hollow needles so that upon rotation of such drum the needles will pass thru the seed mass; by providing the hopper with a seed furrow double winged plow extended from and below the hopper the depth of the seed furrow; by a seed discharge tube having its upper end slotted for the passage therethru of the needles and having its lower end opening behind and between the wings of the plow; and by an air flow programming means so that suction is applied to the needles to pick up seeds, suction released to separate seed from needle, and air pressure applied to the needle to clean it.

A device such as outlined above is hereinafter described in detail and illustrated in the accompanying drawings, in which.

*FIGURES 1, 2, 3, 4 and 5*

Figure 1:
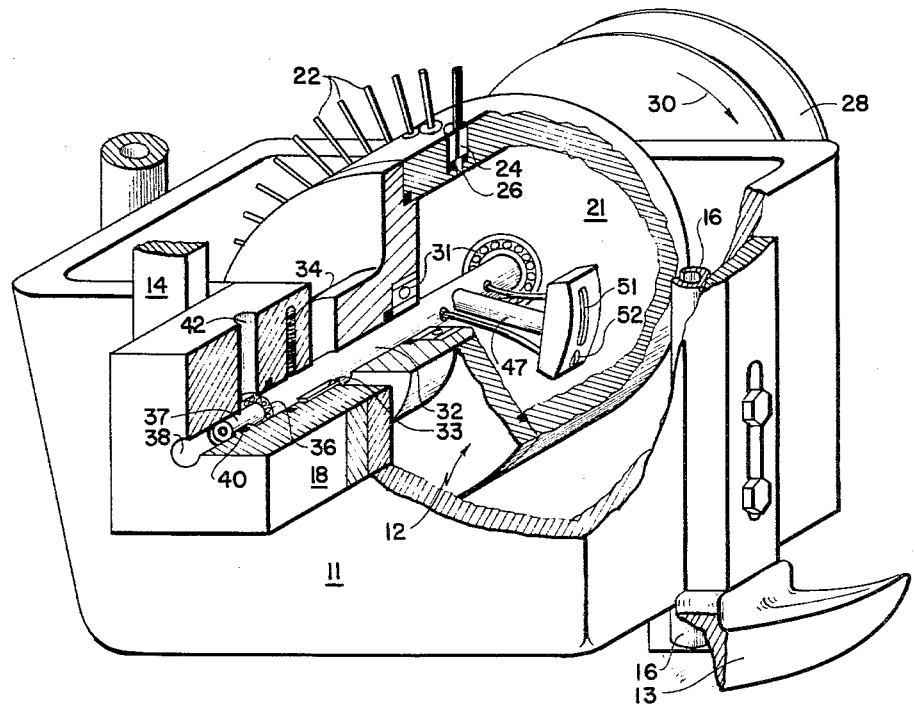
FIGURE 1 is an isometric view partly in quarter section and with parts broken away of a seed segregator and planter forming the subject matter of the present invention.
Figure 2:
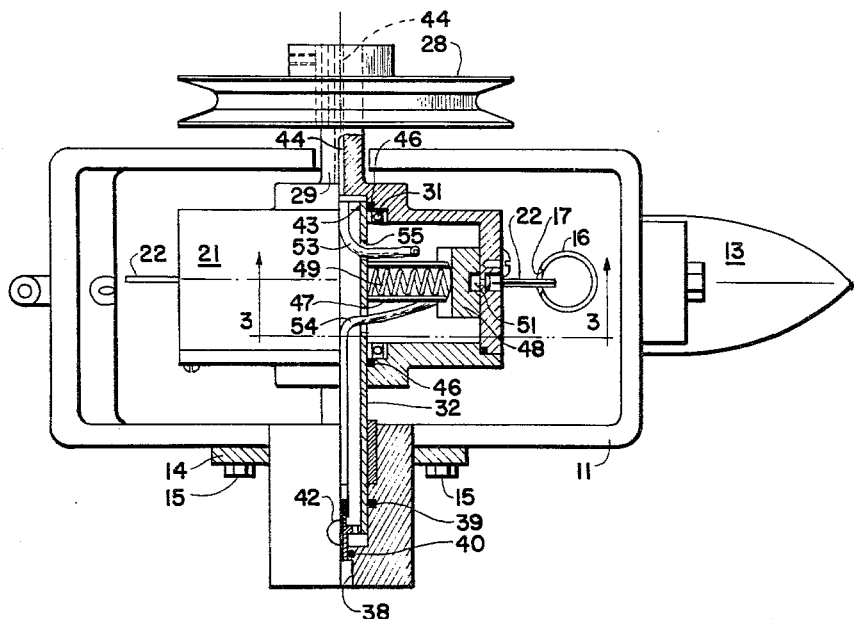
FIGURE 2 is a plan view of FIGURE 1.
Figure 3:
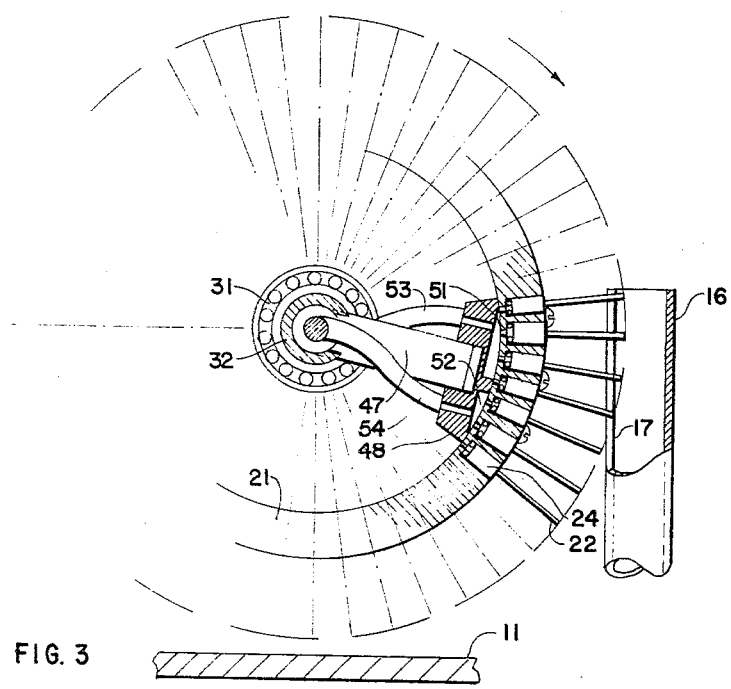
FIGURE 3 is a sectional view on the line 3—3 of FIGURE 2.

In the isometric quarter section of FIGURE 1 and the plan view of FIGURE 2 the principal parts are a hopper 11, a rotatable drum assembly 12, and a winged plow 13. The hopper 11 is carried down the rows to be planted by any suitable vehicle that carries the hopper by means of a standard 14 secured to the hopper by cap screws 15. The plow 13 may make or only smooth the seed furrow. The plow is secured to the hopper by a slotted standard integral with the plow and secured to the hopper by cap screws so that there may be some adjustment of the distance the plow extends below the hopper. Just inside the hopper from the standard of the plow 13 is a seed draft tube 16 that is arranged vertically and extends from just below the top edge of the hopper downward thru the bottom of the hopper to a position between the wings of the plow 13. The upper end portion of the tube is provided with a slot 17 that faces inwardly of the hopper. Also secured to the hopper by the screws 15 on the near side, along with the support standard 14, as shown in the views, is a shaft support block 18 for the reception of a fixed shaft for the rotatable drum assembly 12 and having formed therein openings for the connection thereto of pressure and suction hoses.

Figure 4:
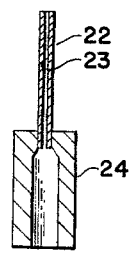
FIGURE 4 is a detailed longitudinal sectional view of one of the needles.
Figure 5:
FIGURE 5 is an enlarged longitudinal sectional view of the tip portion of a needle.

Rotatably mounted in the hopper 13 is the rotatable drum assembly 12 that includes a hollow drum 21 with its axis of rotation transverse the sides of the hopper. Set in the face of the drum and circumjacent thereto is an annular ring of tubular needles 22. These needles are separated circumferentially by equal spaces. The bore 23 of each needle is on a radius of the drum. The needles are coplanar, and when the drum is rotated, the end portion of each needle passes downwardly thru and out of the slot 17 in the upper end of the draft tube 16. Each of the needles is set in a base 24 that is screwed or pressed into a recess in the drum face. The construction is such that the bore of each needle has communication with the inside of the drum thru its own small port opening 26 in the inside face surface of the drum, and the rest of the needle assembly makes an air tight connection with the drum. As examples of the size of the needles, it has been found that for lettuce seed a satisfactory needle is 0.020" outside diameter (O.D.) and 0.008" inside diameter (I.D.), and for broccoli the needle is 0.035" O.D. and 0.020" I.D. Both these sizes extended one-half of an inch from the needle base 24, and forty-eight needles were placed in a three and one-half inch diameter drum. Further, the outer end of the needle is normal to the axis. That is, there is no sharpening of the needle end. However, to decrease the pressure drop thru the length of the needle and to keep the bore clean, it is desirable that the majority of the length of the needle have a slightly larger inside diameter. This, also means a slight increase in the outside diameter. These increases are over those values given above but leaving a portion adjacent the tip with the given values. This construction is shown in FIGURE 5 where the adjacent tip portion 27 is smaller than the rest of the needle 22. This construction results in a stronger needle as compared with the uniform diameters for the length of the needle. However, bigger needles increase the agitation of the mass of seeds in the hopper with the result of possible skips, no seed on a needle. If the needles are shorter, the drum must contact the seed mass with resulting agitation of the mass. FIGURE 4 is an enlarged longitudinal sectional view of a needle assembly.

The rotatable needle drum 21 is rotated by a pulley 28 fixed to a hub 29 extending outboard axially of the drum 21. The intended direction of rotation of the drum is indicated by an arrow 30, clockwise in FIGURES 1, 3, and 6. The drum is supported on and rotates on two spaced apart bearings 31 mounted on a hollow shaft 32 fixed against rotation in the shaft support block 18 by a sliding key 33 and spring detent 34. The shaft support block is integral with the support standard 14, and both block and standard are secured to the hopper by the cap screws 15. The block extends thru the wall of the hopper that is slotted downward from its edge to receive the block. The cap screws pass thru locating flanges secured to the block. Thus, upon removal of the cap screws the hopper may be lowered from the drum assembly 12.

The end portion of the shaft 32 in the support block 18 has therein a spider 36 that holds coaxially of the shaft a nipple 37. The shaft block 18 is bored so that the interior of the nipple communicates with the outside thereof and this opening 38 is adapted to be connected to a source of air pressure. The opening in the block is counterbored from the nipple opening 38 to receive the hollow shaft 32 and the shaft and nipple are sealed peripherally by O-rings 39, 40. Slightly outboard of the shaft end, the block is bored from the top to provide a hole 42 communicating with the end and the inside of the shaft. This opening 42 is adapted to be placed in communication with a suitable source of suction such as an air pump. The unsupported end, the far end in FIGURES 1 and 2, of the shaft 32 is sealed with an apertured plug 43 and the hub 29 of the drum is axially apertured 44 to provide atmospheric communication to the inside of the shaft thru these apertures. The interior of the drum is sealed along the shaft by O-rings 46.

Secured to the fixed shaft 32 inside of the drum is a hollow arm 47 that extends radially of the drum in the direction of the upper end portion of the seed draft tube 16. For this construction, see, also, FIGURE 3. Slidably fitting on the end of the arm 47 is a shoe 48 that has its outer peripheral surface curved to the inner surface of the drum's face. The shoe is pressed against the drum's inner face by a spring 49 placed inside of the arm between the shaft and the shoe. The outer face of the shoe is circumferentially provided with a release slot 51 and, separate from the slot in the direction of rotation of the drum, a pressure opening 52 that is circumferentially shorter than the release slot. Both the slot 51 and the opening 52 come into successive communication with the drum openings 26 to the needle bores 23 as the drum is rotated, and during such communication the needle bores are sealed from the interior of the drum by the shoe fitting against the inner face of the drum. The release slot 51 communicates with the hub aperture 44 thru a piece of tubing 53 connected, thru the hollow shaft 32, between the shoe 48 and the aperture of the shaft end plug 43. The pressure opening 52 communicates with the nipple 37 by means of a piece of tubing 54 between the shoe and the nipple and passing thru the hollow shaft. The shaft is slotted adjacent shoe arm 47 for passage of the tubes. These slots 55, also, provide for the passage of air from the interior of the drum to thru the shaft and out the suction hole 42 in the shaft block 18 so that all of the drum openings 26 and the needle bores 23 not covered by the sliding shoe 48 are subjected to suction, or vacuum.

Preliminary to the operation of the above described modification of the device of the present invention as shown in FIGURES 1, 2, 3, 4, and 5, seed is placed in the hopper so as to cover the needles at the bottom of the drum but not to touch the drum, and as seeds are removed from the hopper more are added by any suitable means. Air suction is applied to the suction opening 42 in the top of the shaft support block 18, and air pressure is applied to the pressure opening 38 in the outer end of the block. The drum is then rotated by means of the pulley 28 to place the device in operation to segregate seeds and to dispense them down the draft tube 16 from which they enter the furrow behind the plow 13 as the device travels along a furrow.

The drum is rotated in the direction indicated by the arrows 30 so that the needle ends go down thru the hopper, then up on over the drum, and then down, thru, and out the slot 17 in the upper end of the draft tube 16. Suction is applied to the needle bores 23 as they go into the mass of seed in the hopper and a seed from the mass is adhered to the end of the needle by the flow of air into the outer needle end. If the seed is pointed and such point enters the needle opening, the resistance of the other seeds tips the seed off or reorientates it on the needle end so that it is held thereto at a side of the seed. The small area of the needle opening and needle end prevents two or more seeds from clustering together under the influence of the air flow into the needle. Thus it is that, as the needles emerge from the seed mass, only one seed adheres to the needle end. If it were to be found that a plurality of seeds were to adhere to a needle, it would mean that the outside diameter of the needle end should be reduced. Reduction of the outside diameter means a reduction of the inside diameter. The ratio of the O.D. to I.D. is about 2 plus or minus 0.50. Variations from this give, either, so much end annular area that plural seed adhere or the pressure drop in the tube is excessive and the seeds fail, at times, to adhere. When the seed carrying needle leaves the seed mass it is carried up and over the drum and down into the open upper end of the draft tube 16 with the needle passing thru the slot 17 in the side of the tube. The port openings 26 in the inner drum control surface enter into alignment with the release slot 51 when each needle end is in the draft tube 16 and the needle is just approaching the horizontal. In this position the needle bore is in communication with the atmosphere thru the drum opening 26, the release slot 51, the release tube 53, and the hub aperture 44. A needle is in the release position for about 22.5 degrees of drum rotation, three times the needle spacing. Then, just as the end of the needle leaves the slot 17, the drum opening 26 comes into alignment with the opening 52 in the shoe to allow air under pressure to blow thru the needle. The air blows for only a few degrees of rotation. This air under pressure comes from the pressure opening 38 in the end of the shaft support block 18, thru the nipple 37 and the pressure tube 54 to the shoe pressure opening 52. This blowing of air thru the needle aids in preventing the outer end of the needle from becoming plugged with foreign matter and aids in keeping the bore of the needle clean. It is seldom needed to effect the release of a seed from the end of the needle. To release the seeds with a blast of air would throw them against the inner wall of the draft tube and cause them to bounce back and forth across the tube. This would increase the distance that the seed would travel in passing down thru the draft tube 16 and, hence, introduce a large variable in the time taken for the seed to pass thru the tube into the furrow. It is even undesirable to blow the seed thru the tube as it may then bounce in the furrow and prevent accurate and evenly spaced placement of the seed in the furrow. It is best to just release the seed and let it drop free in the tube without hitting the tube wall. In this respect, it is important to keep the tube length at a minimum. Applicant has done this by making the tip circle of the needles small, less than five inches, and by only a small clearance between needle ends and the hopper so that the draft tube length may be short, and by placing the plow 13 on, adjacent, and below the hopper so that the bottom of the hopper may ride or just clear the ground surface adjacent the furrow. Thus the seeds need only drop a distance of about three inches. By this arrangement applicant can plant individual seeds on one to six inch centers with a variation of less than plus or minus a quarter of an inch.

Figure 6:
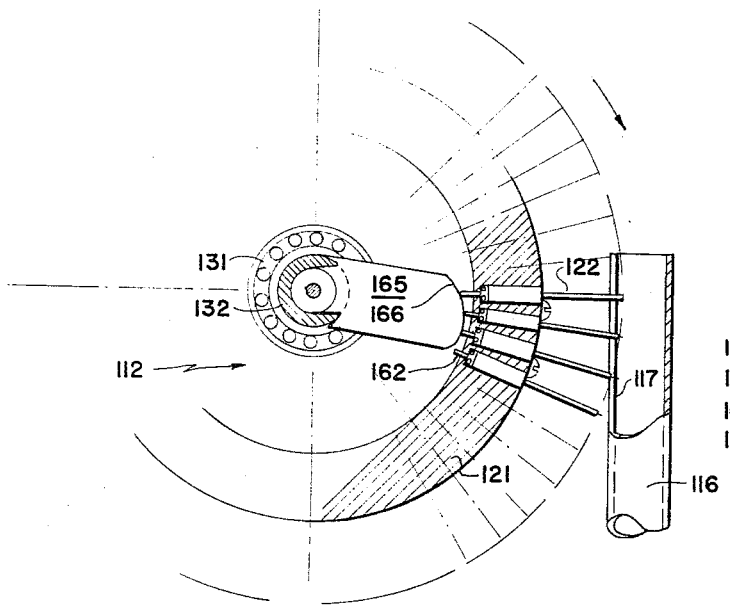
FIGURE 6 and 7 illustrate a modification of the invention, and are views taken similar to FIGURES 3 and 4, respectively.
Figure 7:
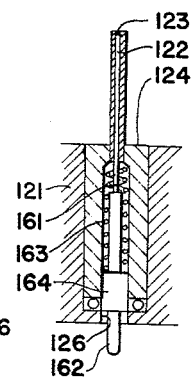

FIGURES 6 and 7

FIGURE 6 is a section thru a modified needle drum assembly 112 taken medially of the drum 121 normal to the fixed hollow shaft 132 on a plane similar to the plane 3—3 of FIGURE 1. This needle drum assembly may be mounted in a hopper identical with the hopper 11 of FIGURE 1, and mounted and driven in the same manner. In FIGURES 6 and 7, parts similar or the same as those of the prior figures are given reference numbers the same as those of the prior figures with a 1 prefix added. In this modification suction is applied to the interior of the drum but there is no atmospheric release or positive air pressure applied to the needles. Thus, such atmospheric and pressure openings to the hollow shaft 132 are blocked, and no passageways for such are provided. The drum 121 rotates on bearings 131 in the same direction as previously so that the ends of the needles pass downwardly thru the slot 117 in the draft tube 116 as a seed is released from the end of the needle. The tubular needles 122 are constructed in much the same manner as previously described and are set in a base 124 retained in a counterbored recess in the drum outer face with the bore of the needle in alignment with an opening 126 formed in the inner face of the drum. In this modification each needle bore 123 contains a cleaner wire 161 that is smaller in diameter than the inside diameter of the needle to the extent that sufficient air can flow thru the needle to hold a seed on the end thereof. In the retracted position of the wire shown in FIGURE 7, the outer end of the cleaner wire is just inside of the needle end. The inner end of the wire is secured in the outer end of a cylindrical stem 162 that is much larger in diameter than the cleaner wire. Surrounding the stem 162 is a compression spring 163, and the interior of the needle base 124 is hollowed out to form a cavity to receive the spring and stem. The stem is long enough to extend a short distance inward of the drum's inner face. A stop 164 is secured to the stem so that when the wire is retraced the stop will rest on the drum adjacent the inner opening 126. The spring 163 bears on this stop and the outer end of the spring cavity to bias the wire inwardly of the drum. The stop 164 is grooved radially of the drum to allow the passage of air, and the stem has clearance in the drum opening 126. The wire is forced outwardly at the drum position where it is desired to disengage the seed from the end of the needle. This is accomplished by means of a cam 165 fixed to the fixed shaft 132. The cam extends radially outward from the shaft to adjacent the inner surface of the drum face and is formed with a cam face 166 in opposition to the drum face, and has a lesser radius of curvature than the drum face. The construction is such that as a needle approaches the point of seed discharge, the inner end of the stem 162 contacts the cam face 166, then as the drum rotates the cam forces the stem and cleaner wire outwardly against the spring 163 and the wire out the end of the needle to dislodge the seed carried on the end of the needle. The wire outer end is held out of the needle for a few degrees before the inner end of the stem passed off the cam face. The spring then retracts the cleaner wire. The inner end of the stem may be called a cam follower. At all times, suction is applied to the bores of the needles. The disengagement of the seeds is purely mechanical. This construction and operation gives good pickup of the seeds and good disengagement. However, the needles must be about as small as those of the previous modification which means that the cleaner wires are very fragile. The movement of the wires in the needle bores keeps the needles clean.

Figure 8:
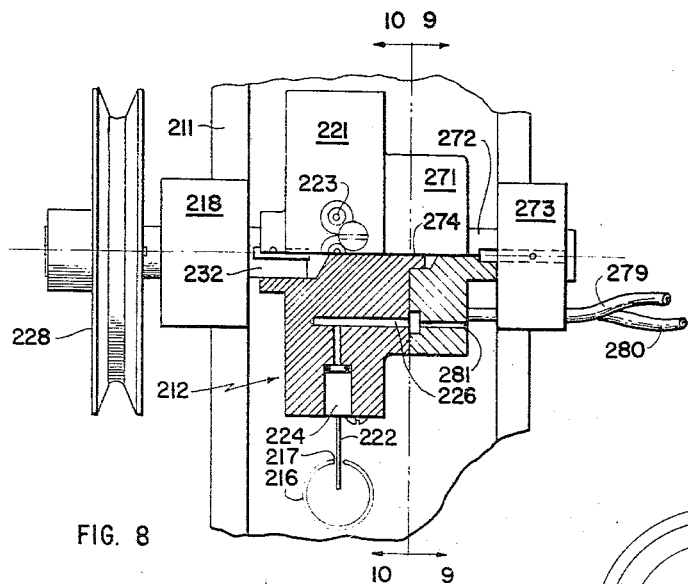
FIGURE 8 is a quarter section plan view with parts broken away of a further modification.
Figure 10:
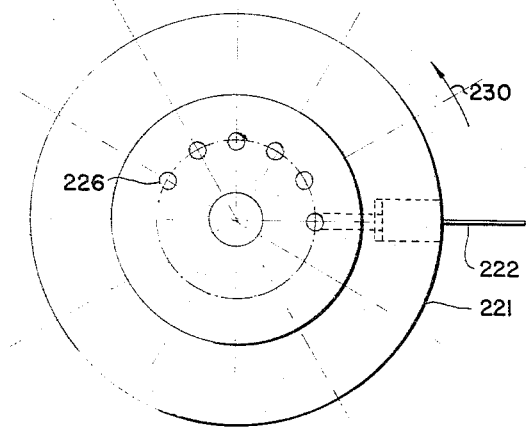
FIGURE 10 is a section on the line 10—10 of FIGURE 8.
Figure 9:
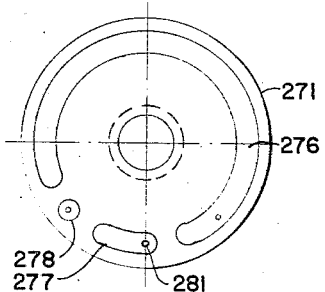
FIGURE 9 is a section on the line 9—9 of FIGURE 8.

FIGURES 8, 9 and 10

Also, in these views, those parts similar to those in the previously described modifications are given the same reference numeral except that the number has had the number 2 prefixed thereto. In the modification shown in FIGURES 8, 9 and 10, FIGURE 8 is a plan view with parts of the seed hopper 211 broken away and the rotary needle drum 221 and a fixed valve plated 271, both, quarter sectioned. FIGURE 9 is a sectional view on the line 9—9 of FIGURE 8, and FIGURE 10 is a sectional view on the line 10—10 of FIGURE 8.

FIGURE 8 shows portions of a seed hopper 211 on and in which is mounted a rotatable drum assembly 212. The seed hopper is similar to the previously described one with a seed draft tube 216 secured therein and extending downward thru the bottom of the hopper. The upper end of the tube has a needle slot 217 formed therein. A shaft support block 218 is secured to the edge of the hopper. The drum 221 is solid except that communication with the needles 222, thru their bores 223 by way of their bases 224 is had by means of drum openings 226, one for each needle. These drum openings are arranged in a circle coaxial of the drum on a side face of the drum opposite that side where a pulley 228 is mounted outboard of the bearing block 218. The pulley is secured on a solid shaft 232 that extends thru the bearing block and into the needle drum on the axis thereof. The shaft is rotatably journaled in the block and fixed in the drum so that rotation of the pulley rotates shaft and drum.

The face of the drum having the circle of drum openings 226 is in opposed contact with a cylindrical valve plate 271 that has away from the drum a hub 272 that is fixed in a block 273 secured to the edge of the hopper. The drum is formed with an axial pilot 274 that fits in a recess in the valve so that plate and drum assemble in proper alignment. Face views of the drum showing the openings 226 and the matching face of the valve plate are shown in FIGURES 10 and 9, respectively. The matching face of the valve plate is provided with an interrupted circular groove that is coaxial of the valve plate and the drum with the same radius as the radius of the drum opening circle. The interruptions divide this annular groove into three parts, a suction groove 276, a release groove 277, and a pressure groove 278. The suction groove extends thruout most of the circle, about 270 degrees. The release groove is 30 degrees, and the pressure groove is 15 degrees with the grooves being separated by 15 degree barriers that are flush with and are part of the face of the valve plate. An opening in the bottom of the suction groove 276 passes thru the plate and into communication with a tube 279 that is connected to an air pump furnishing a suitable suction, or vacuum. Also, an opening in the bottom of the pressure groove 278 passes thru the plate and into communication with a tube 280 that is connected to an air pump furnishing a suitable supply of air above atmospheric pressure. A hole 281 in the bottom of the release groove 277 passes thru the plate to atmosphere.

The operation of this modification is similar to that of FIGURE 1. Seed is placed in the hopper to cover the lowest needles but not touch the drum. Suction and pressure is applied to the suction and pressure tubes. The drum is rotated in the direction of the rotational arrow 230. Suction thru the needles by way of the drum opening 226 and the valve plate suction groove 276, adheres a seed to the end of the needle. This seed is carried up and over the drum and down into the shaft tube 216 where it is released by the drum opening 226 aligning with the release groove 277 in the valve plate to admit atmospheric air to the needle. The drum opening then passes to alignment with the pressure groove 278 to admit air under pressure to the needle to clean it. The valve plate is angularly aligned with respect to the draft tube and its upper end slot 217 to effect the proper functioning of the needles by the proper air pressure distribution thereto.

Having thus described my invention, its construction, and operation, I claim:

1. A seed segregator and planter, comprising: a hopper; a rotatable drum having a peripheral surface and a ported control surface; a plurality of entirely straight hollow needles secured in said peripheral surface, extending radially outward thereof, and being equally spaced peripherally of said drum and being coplanar; said drum being formed with a plurality of openings therein, each of said openings being in communication with the hollow of one of said needles and with said control surface; means for rotating said drum about its axis so that said needles move downwardly and upwardly through said hopper; a non rotatable valve member contiguous with said control surface, said valve member being formed with a plurality of sequentially arranged recesses; a plurality of conduits in communication with said valve member and with its recesses for sequentially subjecting the hollow of each of said needles to various air pressures such as suction, atmospheric, and above atmospheric as the drum rotates; whereby as each of said needles moves down and up through said hopper, first, suction through the needle causes a single seed to be held upon the open end thereof, next, the seed is released by atmospheric pressure, and, finally, the needle is cleaned by positive pressure.

2. The combination of claim 1 in which said control surface is formed by a side of said drum.

3. A seed planter having a hopper formed with a hopper bottom, a backwardly wing seed furrow plow, and means on said hopper supporting said plow adjacent and with said wings below said bottom so that when said plow is in the ground said hopper will be adjacent said ground; a drum, row of entirely straight needles secured to said drum and extending radially outward thereof, a seed draft tube having an upper end portion and a lower end portion, the upper end portion of said tube being formed with a side opening in the radial plane of said needles, and the lower end of said tube terminating between said wings just below said hopper, means for rotatably mounting said drum so that upon rotation thereof portions of said needles move downwardly and upwardly through said hopper and into and out of the upper end of said tube by passing through said side opening, and means for adhering a seed to the outer end of each of said needles as it passes through said hopper and for releasing an adhered seed from the outer end of each of said needles as it passes through the upper end portion of said tube; whereby seeds are taken by said needles from said hopper, placed and released in the upper end of said tube, and delivered between said plow wings.

4. The combination of claim 3 in which said means for releasing a seed from each of said needles includes a wire in and slidable along the hollow of each of said needles, and a cam fixed against rotation for consecutively moving each of said wires outwardly of and a portion thereof out of each such needle upon rotation of said drum.

5. In the combination of claim 3, said needles having an outside diameter to inside diameter ratio adjacent the tip thereof of 2.0 plus or minus 0.50, and a length to outside diameter ratio greater than ten.

References Cited by the Examiner

UNITED STATES PATENTS

| 1,637,834 | 8/1927 | Oliver. | |
| 1,762,671 | 6/1930 | Slathar | 221—211 |
| 2,152,758 | 4/1939 | Cox | 221—211 X |
| 2,737,314 | 3/1956 | Anderson | 111—77 X |
| 2,855,125 | 10/1958 | Grimsbo. | |
| 3,100,462 | 8/1963 | Steele et al. | 111—77 |
| 3,142,274 | 7/1964 | Winter | 221—211 X |

FOREIGN PATENTS 91,940  10/1961  Denmark.

ABRAHAM G. STONE, *Primary Examiner.*

WILLIAM A. SMITH, III, *Examiner.*